United States Patent
Seenappa et al.

(10) Patent No.: US 10,798,635 B2
(45) Date of Patent: Oct. 6, 2020

(54) MOBILE EDGE COMPUTING FOR DATA NETWORK TRAFFIC

(71) Applicant: AT&T Intellectual Property I, L.P., Atlanta, GA (US)

(72) Inventors: Vikram Seenappa, Sammamish, WA (US); Vivek Mhatre, Bellevue, WA (US); Rajendra Prasad Kodaypak, Sammamish, WA (US); Jiansong Wang, Lincroft, NJ (US); Ryan Redfern, Cerritos, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 79 days.

(21) Appl. No.: 16/207,379

(22) Filed: Dec. 3, 2018

(65) Prior Publication Data
US 2020/0178149 A1    Jun. 4, 2020

(51) Int. Cl.
*H04W 40/02* (2009.01)
*H04W 60/04* (2009.01)

(52) U.S. Cl.
CPC .......... *H04W 40/02* (2013.01); *H04W 60/04* (2013.01)

(58) Field of Classification Search
CPC ................................................... H04W 40/02
See application file for complete search history.

(56) References Cited

U.S. PATENT DOCUMENTS

| | | | | |
|---|---|---|---|---|
| 8,565,793 | B1* | 10/2013 | Koodli | H04W 68/04 |
| | | | | 455/458 |
| 8,693,367 | B2* | 4/2014 | Chowdhury | H04L 12/14 |
| | | | | 370/253 |
| 8,848,614 | B2* | 9/2014 | Berg | H04W 40/36 |
| | | | | 370/328 |
| 8,897,183 | B2* | 11/2014 | Andreasen | H04W 28/0226 |
| | | | | 370/310 |
| 9,485,700 | B2* | 11/2016 | Xiong | H04W 36/22 |
| 9,650,794 | B2* | 5/2017 | Stojanovski | H04W 72/082 |
| 9,832,676 | B2* | 11/2017 | Ye | H04W 28/0226 |

(Continued)

FOREIGN PATENT DOCUMENTS

WO    2018045515 A1    3/2018

OTHER PUBLICATIONS

Singh, et al., "Mobile Edge Fog Computing in 5G Era: Architecture and Implementation," 2016 International Computer Symposium, 5 pages.

(Continued)

*Primary Examiner* — Parth Patel
(74) *Attorney, Agent, or Firm* — Amon, Turocy & Watson, LLP

(57) ABSTRACT

The described technology is generally directed towards selectively steering wireless network data packet traffic to a network edge cloud, which reduces backhaul bandwidth and facilitates ultra-low latency communications. In one aspect, upon receiving a request for data communication by a user equipment in the wireless network, location information is used to override a centralized access point name (e.g., 4G serving gateway/packet gateway, S/PGW, or 5G user plane function) with an edge-located access point name (edge 4G S/PGW or edge 5G user plane function). This facilitates the data communication between the user equipment and an edge-located access point device associated with the edge-located access point name.

20 Claims, 10 Drawing Sheets

(56) References Cited

U.S. PATENT DOCUMENTS

| | | | |
|---|---|---|---|
| 9,979,657 B2 | 5/2018 | Batrouni et al. | |
| 10,009,813 B2* | 6/2018 | Sirotkin | H04L 61/2007 |
| 10,037,231 B1* | 7/2018 | Jakhetiya | G06F 9/5072 |
| 10,038,610 B2* | 7/2018 | Gupta | H04M 15/8022 |
| 2008/0276294 A1* | 11/2008 | Brady | H04W 12/007 |
| | | | 726/1 |
| 2011/0228676 A1* | 9/2011 | Zhao | H04W 28/08 |
| | | | 370/236 |
| 2011/0282996 A1* | 11/2011 | Zahavi | H04L 41/12 |
| | | | 709/226 |
| 2012/0008554 A1* | 1/2012 | Kim | H04W 76/12 |
| | | | 370/328 |
| 2012/0036282 A1* | 2/2012 | Chen | H04L 63/0853 |
| | | | 710/9 |
| 2013/0023284 A1* | 1/2013 | Stanger | H04W 4/18 |
| | | | 455/456.1 |
| 2013/0058259 A1* | 3/2013 | Wu | H04W 76/12 |
| | | | 370/259 |
| 2013/0286985 A1* | 10/2013 | Yin | H04L 61/2007 |
| | | | 370/329 |
| 2013/0337808 A1* | 12/2013 | Zhao | H04W 60/00 |
| | | | 455/435.3 |
| 2014/0119340 A1* | 5/2014 | Stojanovski | H04W 8/082 |
| | | | 370/331 |
| 2014/0122698 A1* | 5/2014 | Batrouni | H04L 41/0896 |
| | | | 709/224 |
| 2014/0143428 A1* | 5/2014 | Zheng | H04L 65/1073 |
| | | | 709/226 |
| 2015/0055623 A1* | 2/2015 | Li | H04W 40/04 |
| | | | 370/331 |
| 2015/0172119 A1* | 6/2015 | Mahaffey | H04L 41/0813 |
| | | | 370/254 |
| 2015/0200972 A1* | 7/2015 | Suryavanshi | H04W 12/02 |
| | | | 726/1 |
| 2015/0304970 A1* | 10/2015 | Van Bussel | H04W 12/02 |
| | | | 455/522 |
| 2016/0012451 A1* | 1/2016 | Shanmugam | G06F 21/445 |
| | | | 705/304 |
| 2016/0057677 A1* | 2/2016 | Williams | H04W 48/18 |
| | | | 370/331 |
| 2016/0248703 A1* | 8/2016 | Gopalakrishnan | G06F 9/46 |
| 2016/0295476 A1* | 10/2016 | Bi | H04W 36/12 |
| 2017/0093614 A1* | 3/2017 | Seetharaman | H04L 41/0668 |
| 2017/0126568 A1* | 5/2017 | Lee | H04L 47/12 |
| 2017/0142024 A1* | 5/2017 | Fromentoux | H04L 47/70 |
| 2017/0164185 A1* | 6/2017 | Betti | H04W 56/00 |
| 2017/0171777 A1* | 6/2017 | Laselva | H04W 48/18 |
| 2018/0070288 A1* | 3/2018 | Kim | H04W 36/0016 |
| 2018/0083791 A1* | 3/2018 | Shanbhag | H04L 12/1886 |
| 2018/0109590 A1* | 4/2018 | Rao | H04W 4/029 |
| 2018/0146375 A1* | 5/2018 | Pawar | H04W 36/22 |
| 2018/0183855 A1* | 6/2018 | Sabella | G06F 9/505 |
| 2018/0183860 A1* | 6/2018 | Majumdar | H04L 67/16 |
| 2018/0191908 A1* | 7/2018 | Mehta | H04N 7/15 |
| 2018/0192471 A1* | 7/2018 | Li | H04W 4/60 |
| 2018/0248787 A1* | 8/2018 | Rajagopal | H04L 45/70 |
| 2018/0279180 A1* | 9/2018 | Lee | H04W 36/0011 |
| 2018/0295509 A1* | 10/2018 | Lee | H04W 80/10 |
| 2018/0302835 A1* | 10/2018 | Yamasaki | G05D 1/0214 |
| 2019/0045409 A1* | 2/2019 | Rasanen | H04W 36/12 |
| 2019/0124496 A1* | 4/2019 | Ye | H04L 49/70 |
| 2019/0182876 A1* | 6/2019 | Ying | H04W 8/06 |
| 2019/0254083 A1* | 8/2019 | Stammers | H04W 76/10 |
| 2019/0313479 A1* | 10/2019 | Myhre | H04W 80/12 |
| 2019/0357301 A1* | 11/2019 | Li | H04W 40/20 |
| 2019/0364456 A1* | 11/2019 | Yu | H04W 24/08 |
| 2019/0373443 A1* | 12/2019 | Palaniappan | H04W 60/00 |
| 2019/0394279 A1* | 12/2019 | Dao | H04W 48/04 |
| 2019/0394820 A1* | 12/2019 | Patil | H04W 60/00 |
| 2020/0028896 A1* | 1/2020 | Veldanda | H04L 67/1014 |
| 2020/0067831 A1* | 2/2020 | Spraggins | H04L 41/5009 |
| 2020/0092923 A1* | 3/2020 | Abraham | H04W 76/28 |
| 2020/0099546 A1* | 3/2020 | Haag | H04L 41/0896 |
| 2020/0120145 A1* | 4/2020 | Boerjesson | H04L 65/105 |
| 2020/0120446 A1* | 4/2020 | Stammers | H04W 76/10 |

OTHER PUBLICATIONS

Taleb, et al., "Mobile Edge Computing Potential in Making Cities Smarter," Last Accessed: Jan. 15, 2019, 6 pages.

Taleb, et al., "On Multi-Access Edge Computing: A Survey of the Emerging 5G Network Edge Cloud Architecture and Orchestration," IEEE Communications Surveys & Tutorials, vol. 19, No. 3, Third Quarter 2017, 25 pages.

Tran, et al., "Collaborative Mobile Edge Computing in 5G Networks: New Paradigms, Scenarios, and Challenges," arXiv:1612.03184v2 [cs.NI] Apr. 11, 2017, 7 pages.

Wang, et al., "A Survey on Mobile Edge Networks: Convergence of Computing, Caching and Communications," Date of Publication Mar. 21, 2017, vol. 5, 2017, 23 pages.

\* cited by examiner

MOBILE EDGE COMPUTING FOR DATA NETWORK TRAFFIC

TECHNICAL FIELD

The subject application is related to wireless communication systems, and, for example, to selectively steering wireless network data packet traffic for mobile network edge communications in a wireless network.

BACKGROUND

Contemporary mobility architectures, including in new radio (NR, sometimes referred to as 5G), transport user equipment control plane traffic and user plane traffic over a cell site backhaul network, the common backbone network to mobility management entities (MMEs) located in regional data centers and software and packet data network gateways located in centralized (e.g., national) data centers. NR cells tend to be relatively small, and thus the NR densification that is needed to cover large areas, and the related backhaul overhead issues, are challenging.

At the same time, applications in wireless communication systems such as augmented virtual reality, autonomous vehicle control, large outdoor events, factory automation control, remote surgery and the like can benefit from ultra-low latency communications.

BRIEF DESCRIPTION OF THE DRAWINGS

The technology described herein is illustrated by way of example and not limited in the accompanying figures in which like reference numerals indicate similar elements and in which.

DETAILED DESCRIPTION

Briefly, one or more aspects of the technology described herein are generally directed towards selectively offloading user traffic (user equipment user plane data) locally at a mobile network edge. This significantly reduces latency and provides backhaul bandwidth savings.

In one or more implementations, this can be accomplished via edge steering logic, e.g., incorporated into or coupled to the Mobility Management Entities (MME)/Access and Mobility management Function (AMF), when a user equipment attaches to a wireless network. Based on the user equipment's location information and possibly other factors (e.g., subscription information, data type, edge gateway availability and so on), the edge steering logic can facilitate edge data network traffic communication by the user equipment. In one or more implementations, this is accomplished by overriding a centralized access point name with an edge access device name, and selecting an edge packet data network gateway and serving gateway for the user equipment's communications.

It should be understood that any of the examples and terms used herein are non-limiting. For instance, examples can be based on New Radio (NR, sometimes referred to as 5G) communications between a user equipment and a network device; however virtually any communication system including 4G LTE and future generations of wireless technology may benefit from the technology described herein, and/or their use in different spectrums may likewise benefit. As another example, the technology is not limited to any particular type of user equipment machine type communication devices, but rather any wireless-capable user equipment may benefit from the technology described herein, including smartphones, machine type communication devices, wearables, sensors, tablets, notebooks, modems (cards, dongles/adapters (e.g., USB)) and so on. Thus, any of the examples herein are non-limiting examples, and any of the embodiments, aspects, concepts, structures, functionalities or examples described herein are non-limiting, and the technology may be used in various ways that provide benefits and advantages in wireless radio communications in general.

Figure 1:
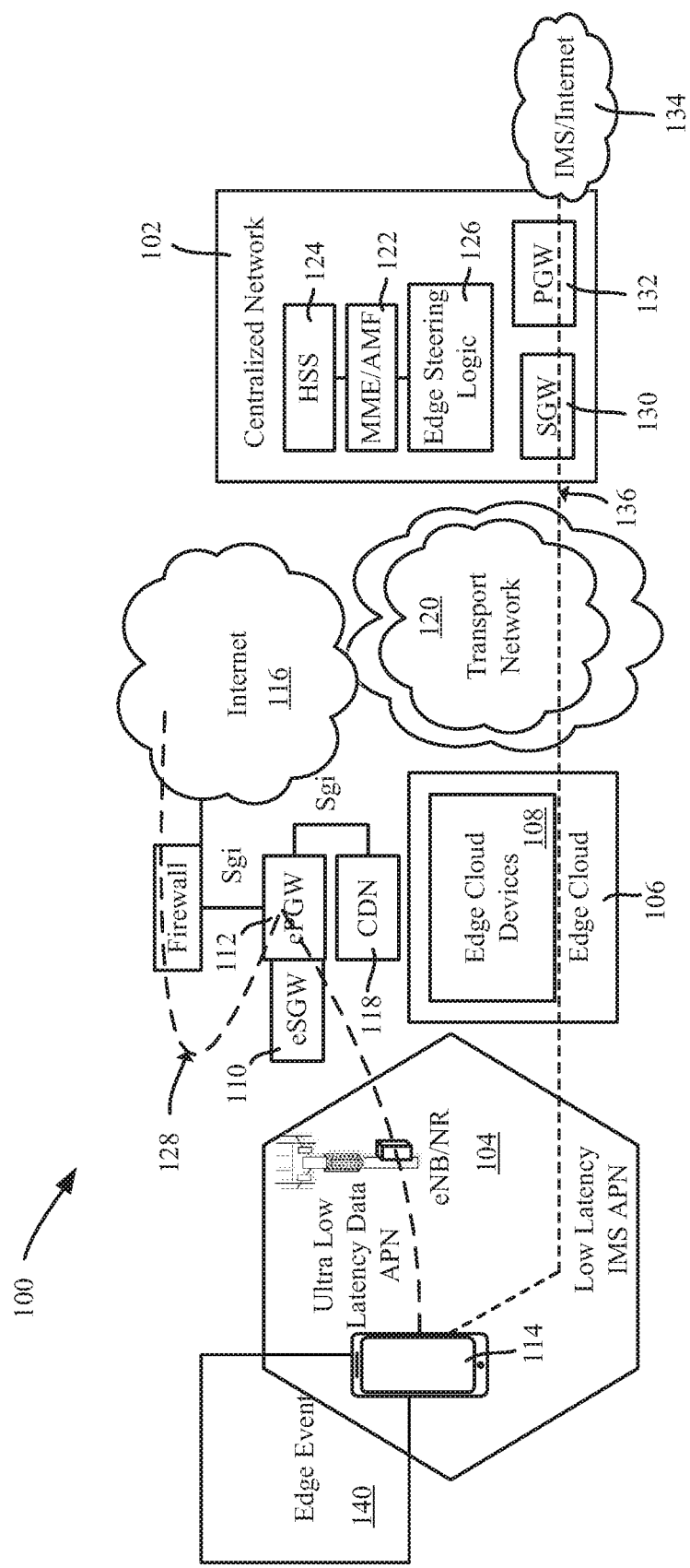
FIG. 1 illustrates an example wireless communication system comprising an edge computing architecture including edge steering logic that determines whether data is to be offloaded locally to a network edge cloud, in accordance with various aspects and implementations of the subject disclosure.

FIG. 1 illustrates an example wireless communication system 100 in accordance with various aspects and embodiments of the subject technology, including an edge network architecture coupled to a centralized network 102. Example edge network architecture components shown in FIG. 1 include a cell corresponding to an eNodeB/NR (eNB/NR)

104, and an edge cloud 106 comprising physical and/or virtual devices 108/cloud computing components such as virtual machines, pods, nodes, containers, and/or clusters. The exampled edge cloud 106 is associated with (at least one) edge Serving GateWay (eSGW) 110 and an edge Packet data network GateWay (ePGW) 112 that can be used to couple a user equipment 114 to the internet 116 and/or one or more Content Delivery Networks (CDN) 118. As is understood, the eSGW 110 resides in the user plane and forwards and routes packets to and from the eNodeB 104 and the ePGW 112.

In general, the user equipment 114 attaches to the wireless network via a transport network 120 to the centralized network 102. More particularly, the user equipment attaches via an MME/AMF component 122 thereof, which then gets the user equipment's relevant subscription information from, for example, a home subscriber server, or HSS 124. As described herein, edge steering logic 126 (e.g., enhanced logic incorporated into the MME/AMF component 122, or external logic otherwise coupled thereto), decides whether to steer/offload the user equipment's data plane traffic through the network edge (represented by dashed line 128), or to use a centralized Serving GW (SGW) 130 and centralized Packet data network GW (PGW) 132 for user equipment data communication with the internet protocol multimedia subsystem (IMS)/internet 134 (dashed line 136).

By way of example, consider that the eNB/NR 104 is set up at a network edge to handle an (edge) event, such as a concert and/or stadium (e.g., sporting) event, in a high-density area represented in FIG. 1 via block 140. Stadium and event coverages can be addressed through a Distributed Antenna System (DAS), e.g., with carrier aggregation. As can be readily appreciated, offloading a significant amount of data traffic at the network edge instead of via backhaul link(s) to the centralized network 102 provides significant bandwidth savings. The proximity of the user equipment to the edge cloud can also significantly reduce latency.

Figure 2:
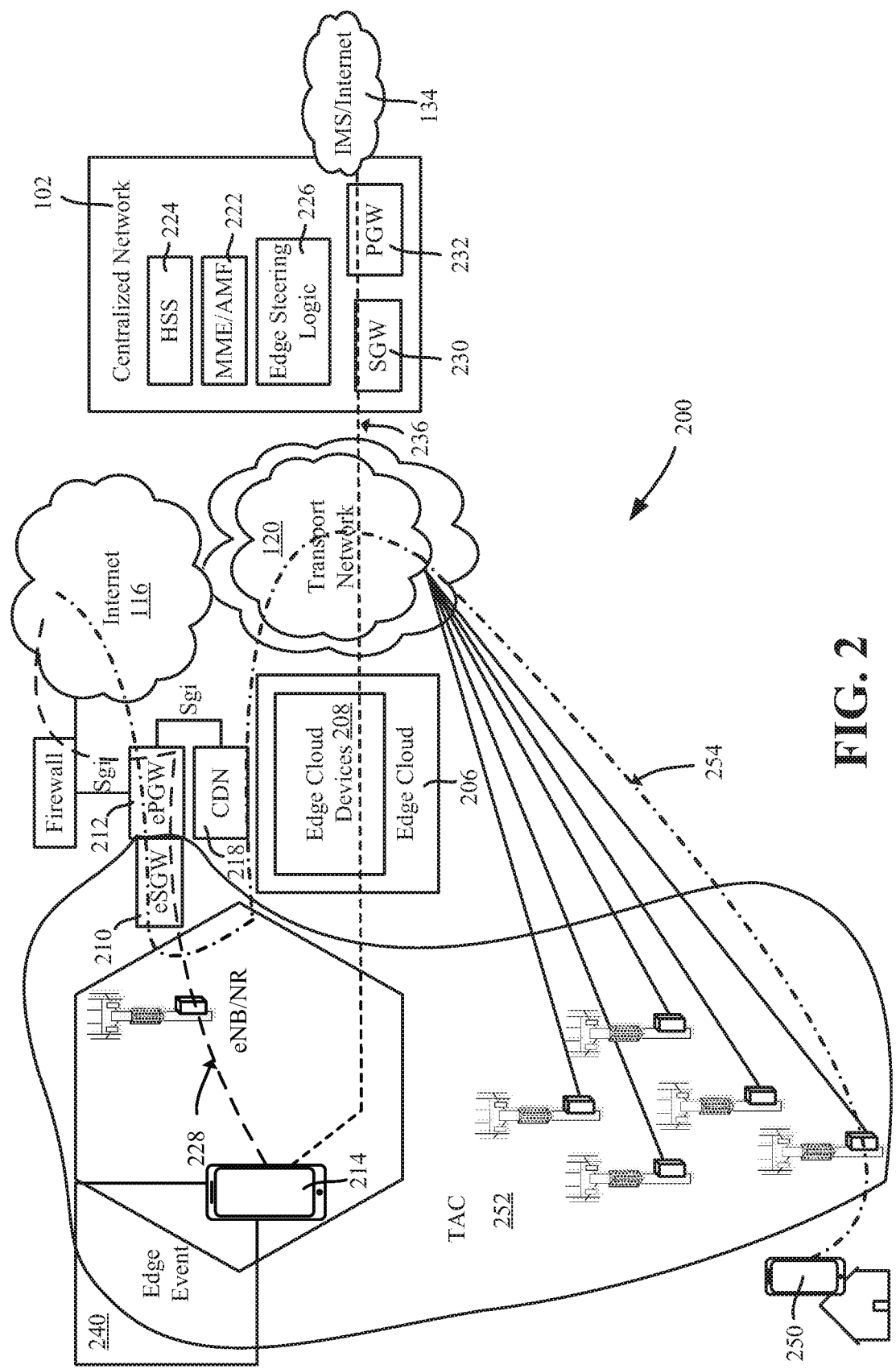
FIG. 2 illustrates an example wireless communication system comprising an edge computing architecture at a Tracking Area Code (TAC) level with multiple eNodeB/New Radio support that includes edge steering logic that determines whether data is to be offloaded locally to a network edge cloud, in accordance with various aspects and implementations of the subject disclosure.

FIG. 2 illustrates another example wireless communication system 200 in accordance with various aspects and embodiments of the subject technology, including another edge network architecture coupled to the centralized network 102. Note that in FIG. 2, any instances of components labeled 2xx are generally the same as their counterpart instances 1xx in FIG. 1, and are generally not described again for purposes of brevity.

In FIG. 2, in addition to edge event 240 communications via the user equipment 214 (lines 228 or 236), another user equipment 250 has its data offloaded through the edge network architecture based on its tracking area code, or TAC 252. This is represented in FIG. 2 by the dashed-dotted line labeled 254. By way of another example, this can be because the user equipment has subscription information or the like indicating that ultra-low-latency communications are needed.

Figure 3:
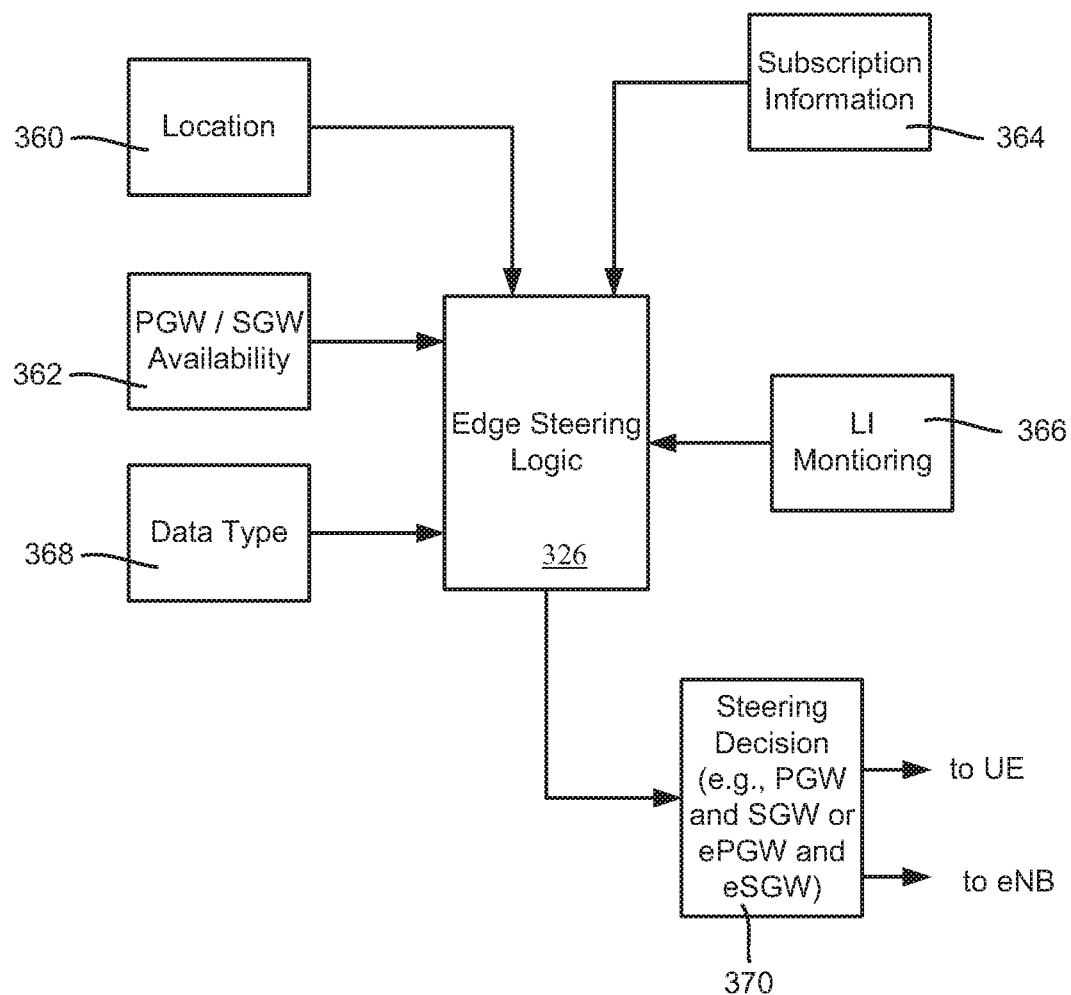
FIG. 3 is an example block diagram illustrating various input information that can be used by edge steering logic in determining whether to offload user data traffic to a network edge cloud, in accordance with various aspects and implementations of the subject disclosure.

FIG. 3 provides examples of information that may be used by edge steering logic 326 in deciding whether to offload a user equipment's data traffic to an edge network, or continue to provide conventional access via the centralized network. Location information 360 of the user equipment provides one piece of relevant information, as the edge steering logic 326 needs to determine based on the location information 360 whether packet and serving gateways are available (block 362) for offloading the data traffic. Further, not every cell will have edge cloud capabilities.

Another piece of relevant information can be subscription information. In general, different subscriptions can correspond to different latency needs, and thus, for example a user equipment with a subscription corresponding to remote surgery is highly likely (if not guaranteed) to get edge cloud data offloading, and typically the subscriber pays more for the data service. In contrast, whereas a regular consumer subscriber may or may not. For example, in a stadium/event setting, a wireless network may decide that edge cloud data offloading reduces network resources bandwidth), and thus subscription information is not particularly relevant. However, not in such a setting, a user equipment with a regular subscription may get edge cloud data offloading, but only if sufficient edge computing resources are available, and may get normal routing if resources become less available.

Another factor is whether there is any lawful interception (LI/CALEA, or LI/commission on accreditation for law enforcement agencies) associated with the user equipment More particularly, when a user equipment attaches to the wireless network, the MME/AMF checks whether there is any LI/CALEA monitoring setup for the user equipment, based on its unique subscriber identity. If so, the edge steering logic obtains this information 366, and disallows edge network data routing in one more implementations; (although it is feasible that in alternative/future implementations, edge components can be configured for lawful intercept operations).

Data type information 368 is another possible factor. For example, the MME/AMF can evaluate the content and change the service type, e.g., to conserve backhaul bandwidth. A user equipment for autonomous vehicle control in a congested traffic area can be treated differently from autonomous vehicle control in a desolate traffic area. Machine type communications (IoT) domains with different packet content can have different decisions made therefor by the steering logic.

Based on one or more of the various information, the edge steering logic 326 makes a decision 370 as to whether or not to offload the user equipment data plane traffic to the edge network. This decision can result in information (e.g., an override edge access point name) being provided to the user equipment and information provided (e.g., the edge SOW to the eNB), as described herein.

Note that at least some of the information exemplified in FIG. 3 can change at any time, particularly location and gateway availability. Thus, the edge steering logic can reevaluate and reroute data traffic as desired. For example, a user may move away from the edge cloud, and thus no longer have traffic offloaded to the edge.

It should be noted that the packet core can contain charging systems that are appropriately updated/notified by the network device that overrides the APN, to account for APN overriding. In this way, the mobile operator can track the amount of data of a given user that was offloaded via an edge cloud APN override. As a result, users can potentially be charged different monetary amounts for data usage depending on how much of their data is offloaded to the edge.

Figure 4:
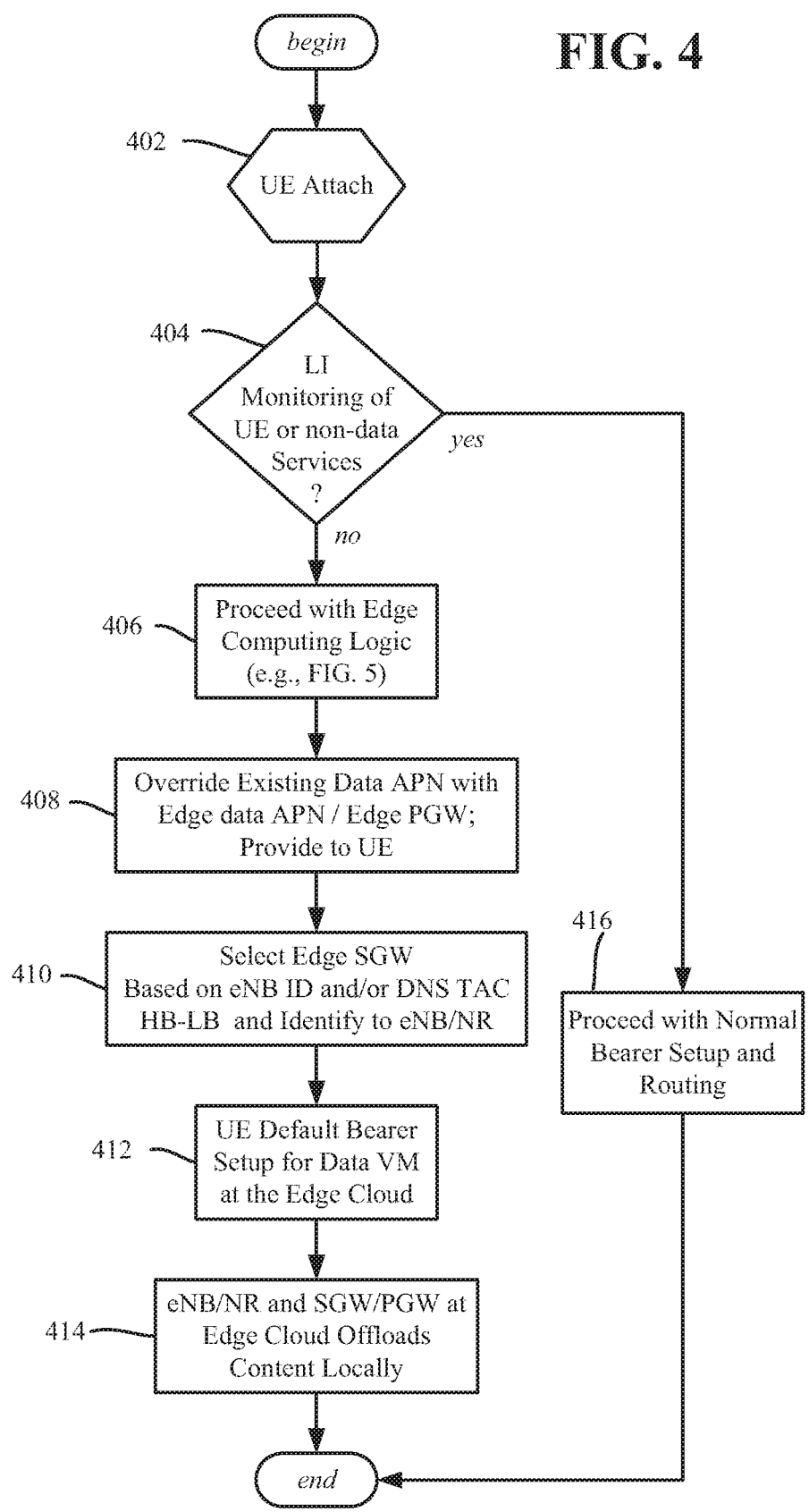
FIG. 4 is a flow diagram of example operations for edge computing logic that can be used to offload user data traffic to a network edge cloud, in accordance with various aspects and implementations of the subject disclosure.

FIG. 4 is a flow diagram summarizing some example operations described herein. Operation 402 represents when the user equipment (UE) attaches to the wireless network, e.g., the MME/AMF components. As described herein, the MME/AMF obtains the UE subscription information from the subscriber databases (e.g., HSS, UDM/UDR, etc.).

Operation 404 evaluates the LI/CALEA monitoring status, and in this example, also checks whether the communications are for non-data services, e.g., is inappropriate for edge rerouting, e.g., conventional voice (not super high definition audio) data/IMS data is not offloaded to the edge. If either, the process branches to operation 416, which represents proceeding with normal bearer setup and routing. Otherwise, the process continues to operation 406, which, if desired, can further evaluate the information (e.g., exemplified in FIG. 3) to determine whether to offload the user plane data to the edge. Note that FIG. 5, described herein, represents some of this further evaluation.

Figure 5:
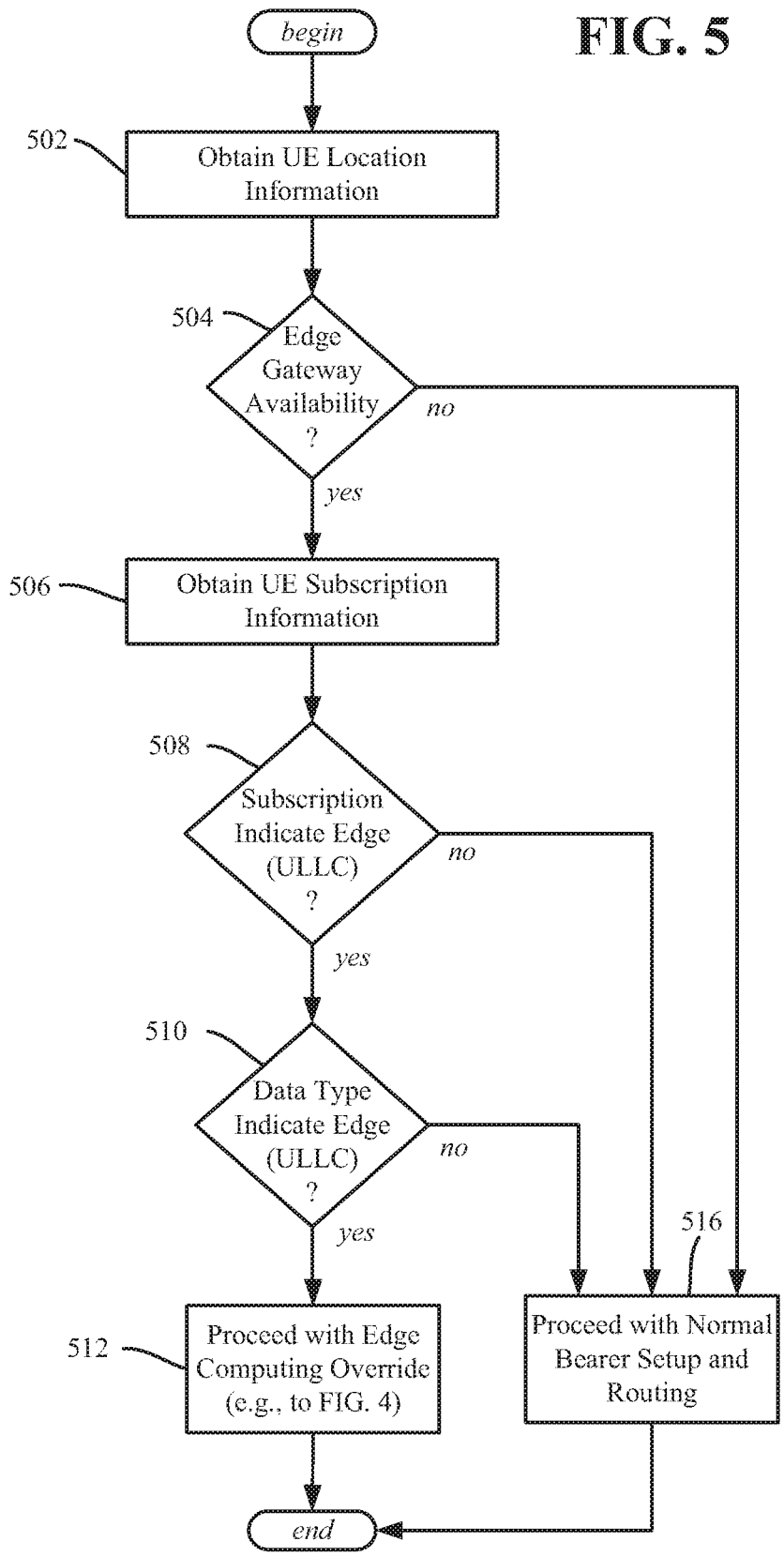
FIG. 5 is a flow diagram of example operations of additional operations that that can be performed by edge steering logic to help in determining whether to offload user data traffic to a network edge cloud, in accordance with various aspects and implementations of the subject disclosure.

For example, in FIG. 5, the location information is obtained at operation 502, e.g., the MME/AMF checks from which eNB/NR/TAC the UE request was made; operation 504 evaluates whether the eNB/NR/TAC has any edge eSGW and edge ePGW available (e.g., based on intelligence in MME/AMF or APN DNS (access point name, domain name service). If not, operation 516 (similar to operation 416 of FIG. 4) proceeds with normal bearer setup and routing.

Operations 506 and 508 are optional operations that represent obtaining and evaluating the subscription information, respectively, to determine whether the data can be edge offloaded. As described above, a subscription type can be associated with one or more various edge-related settings, e.g., definitely offload to the edge, offload when sufficient resources are available, do not offload and so forth.

Operation 510 is similarly an optional operation, and represents evaluating the type of data to be transported. For example, virtual reality-related data can be offloaded to the edge (operation 512), whereas conventional video data that does not need ultra-low latency may not be offloaded (operation 514). Again, this can be dependent on available edge resources.

Operation 512 thus is performed if the various pieces of information that the edge steering logic chooses to evaluate, along with any other information (resource/bandwidth savings), indicate that data traffic is to be offloaded to the edge cloud. This operation, for example, can correspond to operations 408, 410, 412 and 414 of FIG. 4.

Returning to FIG. 4, if the data is to be offloaded to the edge, operation 408 represents the steering logic (e.g., in the MME) overriding the data APN (the centralized PGW) with the edge APN (ePGW), and providing this edge APN back to the UE. For example, with respect to the PGW selection, based on the UE APN (e.g., NextGen Phone), the MME/AMF does an APN override and assigns the edge NextGen Phone APN to a UE that is hosted on the PGW at the edge cloud.

Operation 412 represents the logic (MME) selecting the edge SGW, which is based on a local entry or via DNS records (e.g., NAPTR records or SRV records) and identifies the SGW (provides the UL TEID/uplink Tunnel Endpoint Identifier) to eNB/NR. Note that for SGW selection, based on the eNB/NR TAC, the edge SGW is selected through APN DNS or a local eNB/NR ID or TAC entry on MME/AMF.

Operation 412 represents the user equipment default bearer setup for data VM at the edge cloud. At operation 414, the user equipment sets up Packet Data Connection through the edge APN to the edge eSGW and edge ePGW, whereby the traffic is offloaded locally at the edge.

Figure 6:
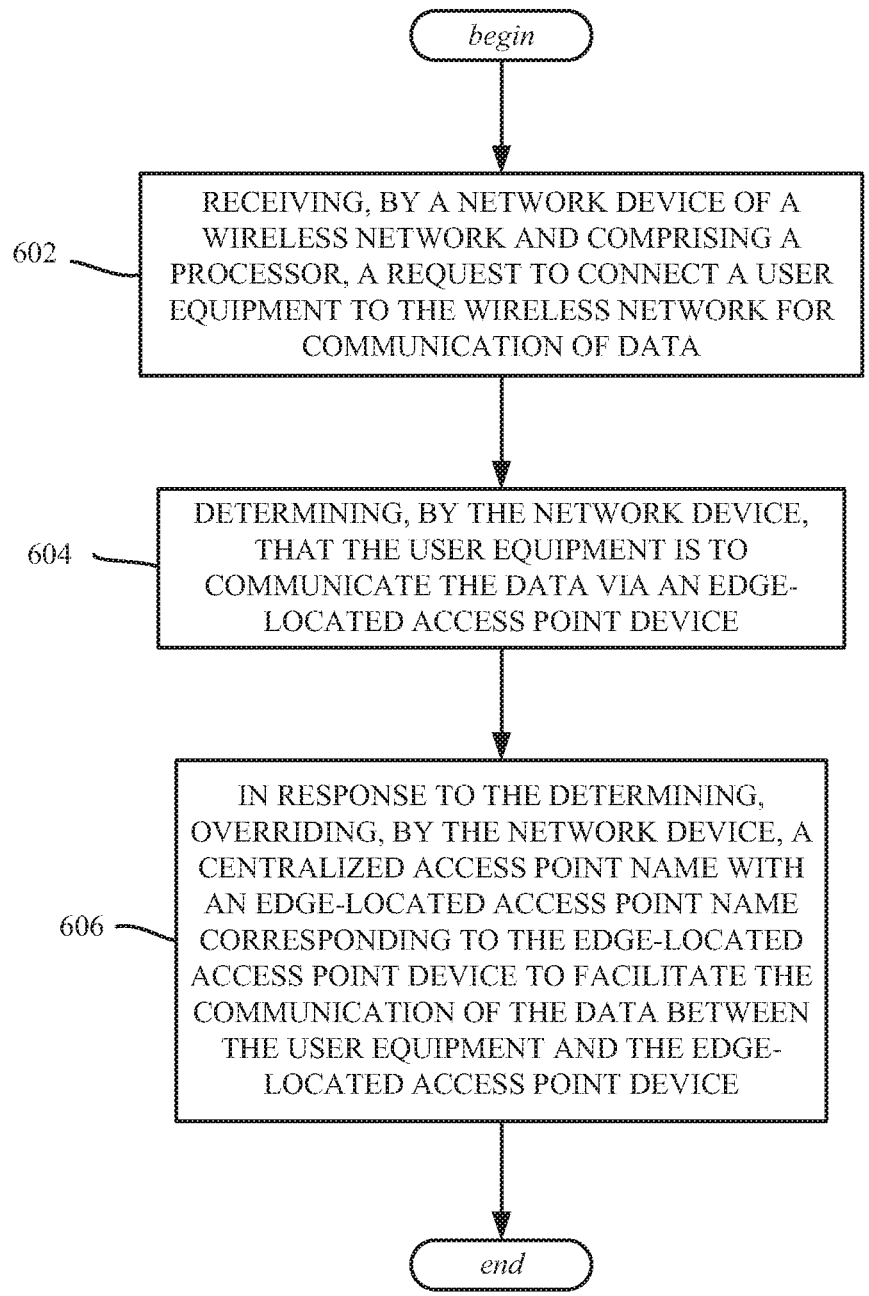
FIG. 6 illustrates a flow diagram directed towards example network device operations directed towards offloading data to an edge access point device, in accordance with various aspects and implementations of the subject disclosure.

One or more aspects, generally represented in FIG. 6, represent example operations, comprising receiving (operation 602), by a network device of a wireless network and comprising a processor, a request to connect a user equipment to the wireless network for communication of data. Operation 604 represents determining, by the network device, that the user equipment is to communicate the data via an edge-located access point device. Operation 606 represents, in response to the determining, overriding, by the network device, a centralized access point name with an edge-located access point name corresponding to the edge-located access point device to facilitate the communication of the data between the user equipment and the edge-located access point device.

Overriding the centralized access point name with the edge-located access point name can comprise overriding an existing packet data network gateway device with an edge packet data network gateway device. Determining that the user equipment is to communicate the data via the edge-located access point device can comprise determining that the edge packet data network gateway device is available.

Aspects can comprise selecting, by the network device, a user plane function (e.g., 4G S/PGW and/or 5G UPF) for the user equipment based on an identifier of the edge-located access point device. Determining that the user equipment is to communicate the data via the edge-located access point device can comprise determining that the edge user plane function (e.g., 4G S/PGW and/or 5G UPF) is available.

Aspects can comprise, selecting, by the network device, a user plane function (e.g., 4G S/PGW and/or 5G UPF) for the user equipment based on a tracking area code associated with a tracking area of the wireless network. Determining that the user equipment is to communicate the data via the edge-located access point device can comprise establishing that there is no lawful interception monitoring associated with the user equipment.

Determining that the user equipment is to communicate the data via the edge-located access point device can comprise obtaining subscription information associated with the user equipment and determining, based on the subscription information, that the user equipment qualifies for the communication of the data via the edge-located access point device. Determining that the user equipment is to communicate the data via the edge-located access point device can comprise evaluating data service type information associated with the user equipment and determining, based on the data service type information, that the user equipment is to communicate the data via the edge-located access point device.

Aspects can comprise communicating with a core charging system to facilitate tracking an amount of data associated with the communication of the data between the user equipment and the edge-located access point device.

Figure 7:
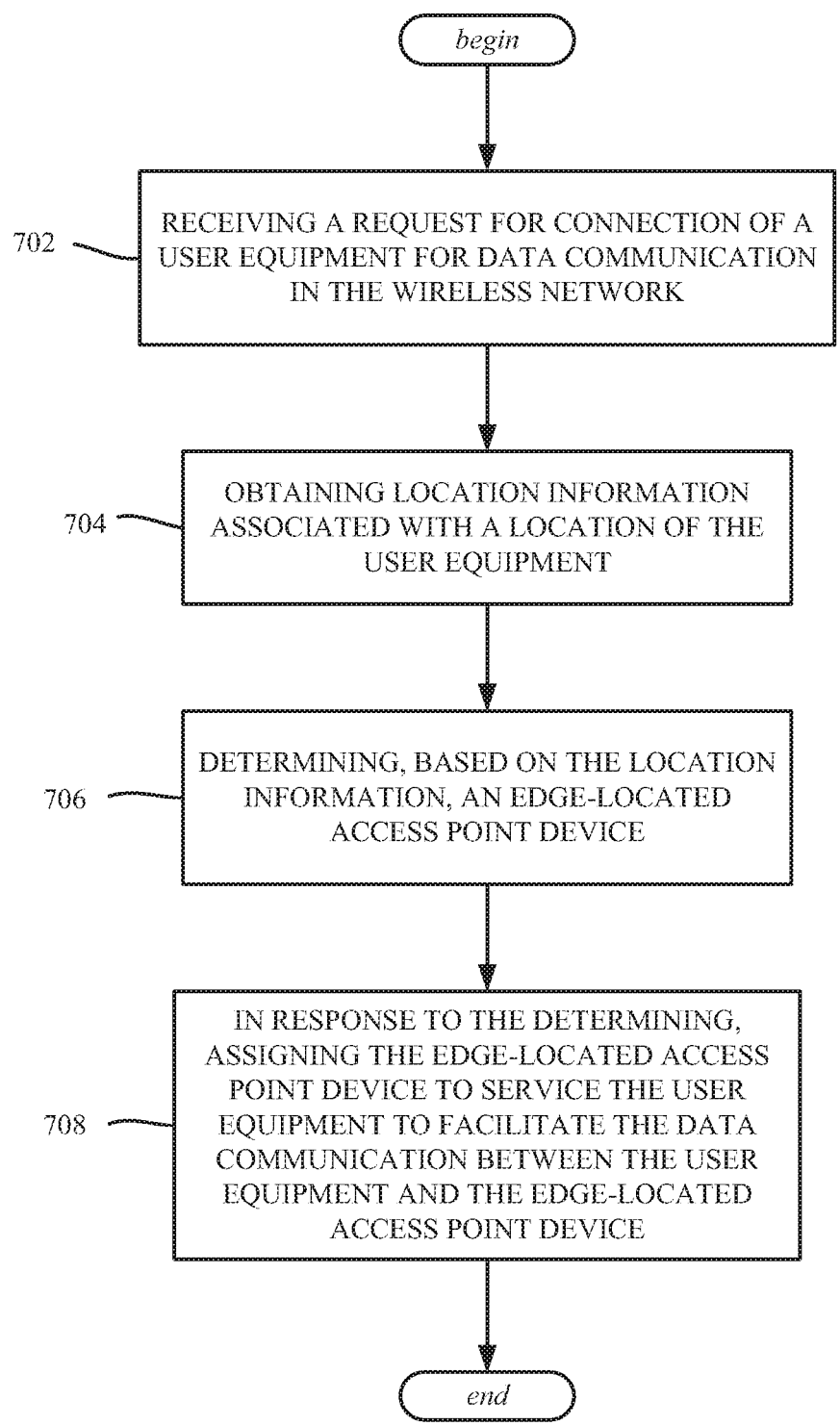
FIG. 7 illustrates example operations, e.g., via instructions performed by a processor, for assigning an edge access point device to a user equipment to offload data traffic, in accordance with various aspects and implementations of the subject disclosure.

FIG. 7 represents an example system, e.g., comprising a processor and a memory that stores executable instructions that, when executed by the processor, facilitate performance of example operations. Operation 702 represents receiving a request for connection of a user equipment for data communication in the wireless network. Operation 704 represents obtaining location information associated with a location of the user equipment. Operation 706 represents determining, based on the location information, an edge-located access point device. Operation 708 represents, in response to the determining, assigning the edge-located access point device to service the user equipment to facilitate the data communication between the user equipment and the edge-located access point device.

Obtaining the location information can comprise evaluating an identifier of a local node associated with the user equipment or evaluating a tracking area code representative of a tracking area associated with the connection of the user equipment. Assigning the edge-located access point device to service the user equipment can comprise overriding a centralized access point name with an edge-located access point name corresponding to the edge-located access point device.

Aspects can comprise establishing that the edge-located access point device is able to service the user equipment based on at least one of: a first availability of an edge 4G packet data network gateway device, a second availability of an edge 4G serving gateway, or a third availability of an edge 5G user plane function.

Further aspects can comprise establishing that the edge-located access point device is able to service the user equipment based on determining, according to a criterion, that no interception monitoring associated with the user equipment is related to CALEA. Further aspects can comprise establishing that the edge-located access point device is able to service the user equipment based on obtaining subscription information associated with the user equipment, and determining, based on the subscription information, that the user equipment qualifies for the data communication between the user equipment and the edge-located access point device. Further aspects can comprise establishing that the edge-located access point device is able to service the user equipment based on evaluating data service type information associated with the user equipment.

Figure 8:
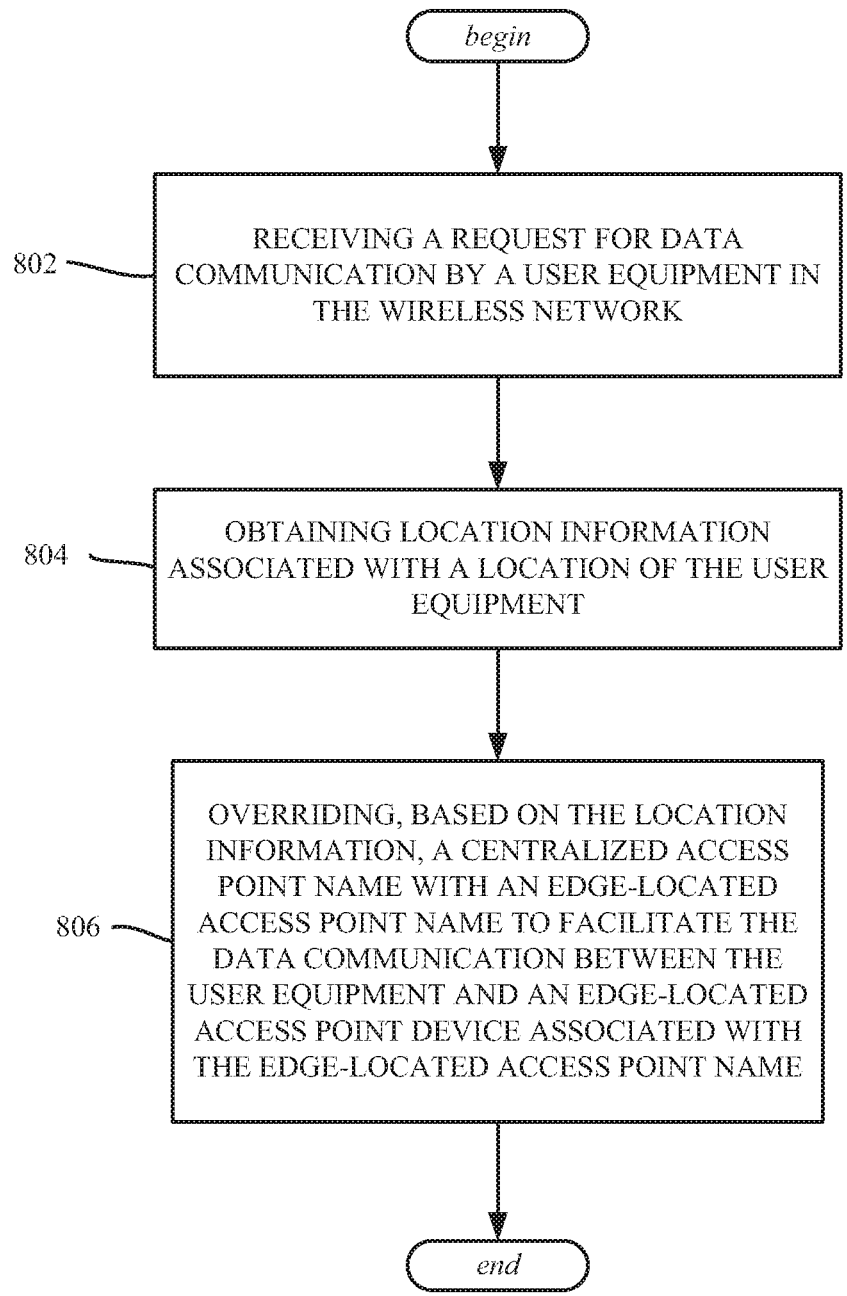
FIG. 8 illustrates a flow diagram directed towards example operations for overriding an access point device name with an edge access point device name to facilitate edge data communications, in accordance with various aspects and implementations of the subject disclosure.

One or more aspects are represented in FIG. 8 as example operations, such as corresponding to a machine-readable storage medium, comprising executable instructions that, when executed by a processor, facilitate performance of the operations. Operation 802 represents receiving a request for data communication by a user equipment in the wireless network. Operation 804 represents obtaining location information associated with a location of the user equipment. Operation 806 represents overriding, based on the location information, a centralized access point name with an edge-located access point name to facilitate the data communication between the user equipment and an edge-located access point device associated with the edge-located access point name.

Further operations can comprise determining that the edge-located access point device is able to service the user equipment based on at least one of: determining a first availability of an edge 4G packet data network gateway device, determining a second availability of an edge 4G serving gateway, determining that interception monitoring associated with the user equipment is nonexistent or not related to CALEA, or determining a third availability of an edge 5G user plane function.

Further operations can comprise determining that the edge-located access point device is able to service the user equipment based on at least one of: obtaining subscription information associated with the user equipment and determining, based on the subscription information, that the user equipment qualifies for the data communication between the user equipment and the edge-located access point device, and/or determining, based on a data service type to be communicated, that the data service type is suitable for the data communication between the user equipment and the edge-located access point device.

The location information can comprise first location information associated with a first location of the user equipment, the edge-located access point name can comprise a first edge-located access point name and the edge-located access point device is a first edge-located access point device, and further operations can comprise, obtaining second location information associated with a second location of the user equipment, and overriding, based on the second location information, the first edge-located access point name with a second edge-located access point name to facilitate data communication between the user equipment and a second edge-located access point device associated with the second edge-located access point name.

As can be seen, there is provided a technology that supports ultra-low latency (e.g., 5G and beyond) edge use applications, such as use cases for autonomous vehicles, augmented virtual reality, factory automation controls, remote surgery and so forth. The technology provides significant savings, including with respect to transport network bandwidth. As 5G often uses relatively small cells, the small cell eNBs can communicate to core network elements (e.g., AMF/MME, PGW, SGW through Internet Protocol Security) and offload the internet traffic directly over the backhaul.

Figure 9:
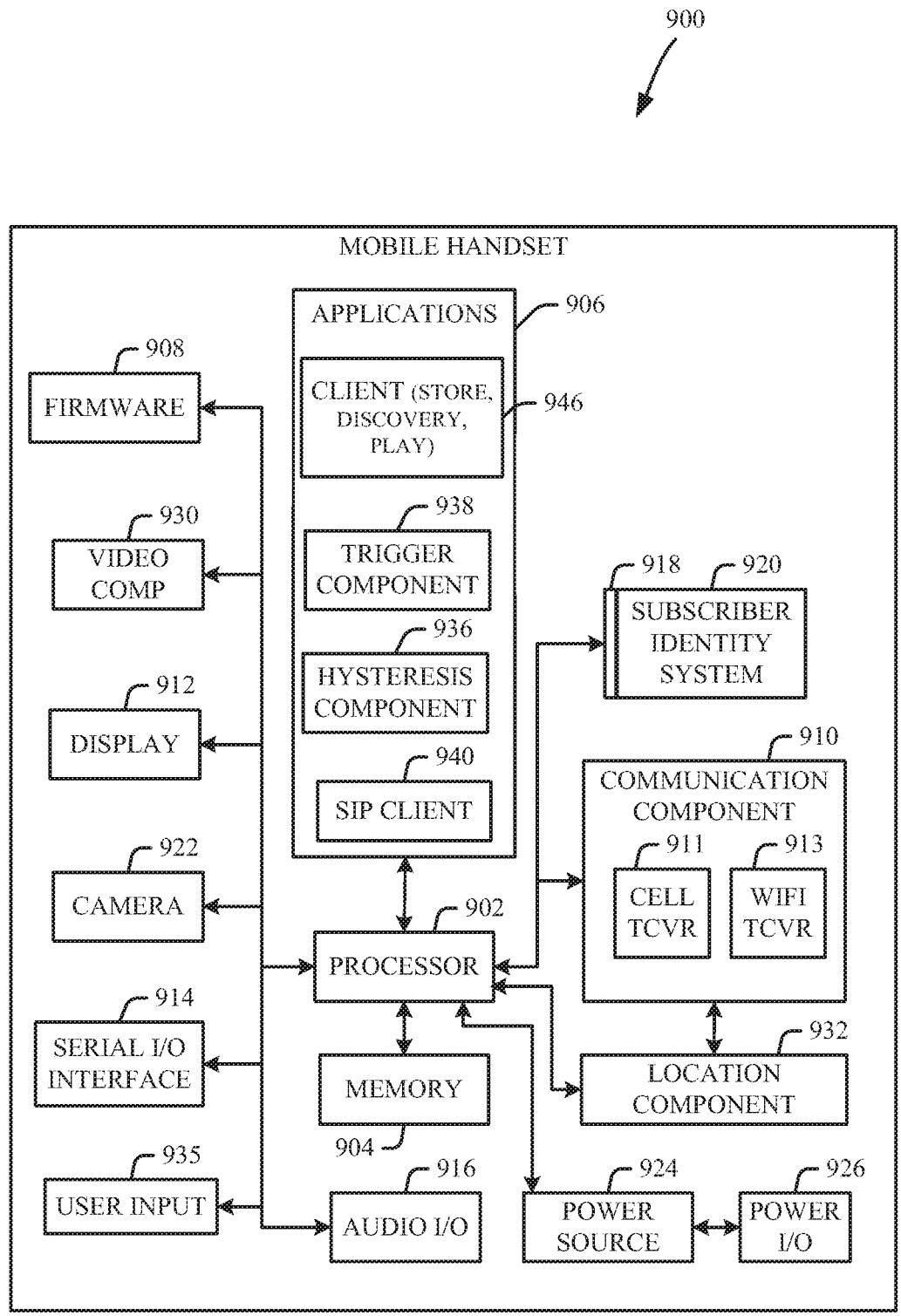
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, Solid State Drive (SSD) or other solid-state storage technology, Compact Disk Read Only Memory (CD ROM), Digital Video Disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
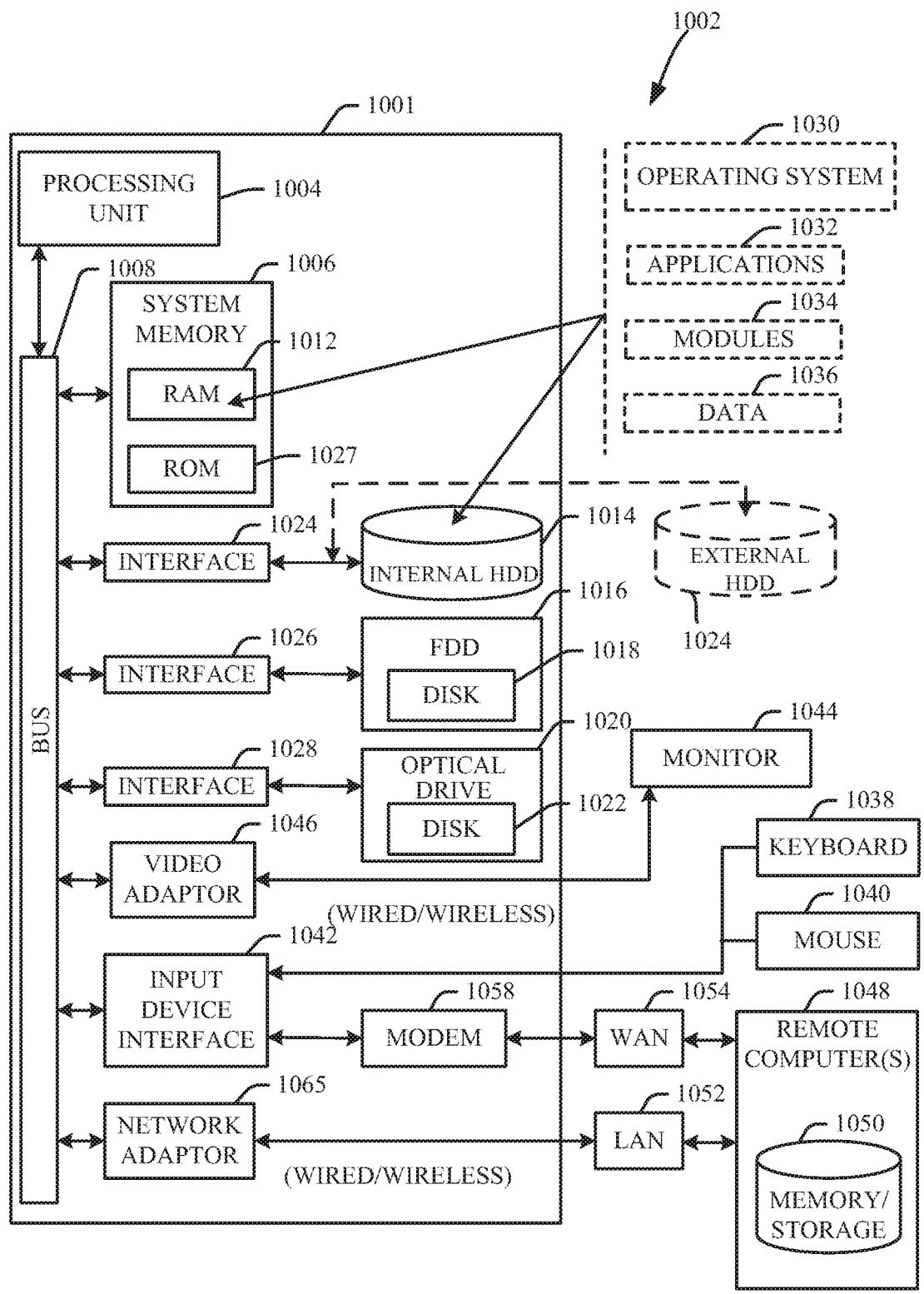
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, Digital Video Disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in Read Only Memory (ROM), Programmable ROM (PROM), Electrically Programmable ROM (EPROM), Electrically Erasable ROM (EEPROM), or flash memory. Volatile memory can include Random Access Memory (RAM), which acts as external cache memory. By way of illustration and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1394), and Small Computer Systems Interface (SCSI).

System memory 1016 can include volatile memory 1020 and nonvolatile memory 1022. A Basic Input/Output System (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, Dynamic RAM (DRAM), Dynchronous DRAM (SDRAM), Double Data Rate SDRAM (DDR SDRAM), Enhanced SDRAM (ESDRAM), Synchlink DRAM (SLDRAM), Rambus direct RAM (RDRAM), Direct Rambus Dynamic RAM (DRDRAM), and Rambus Dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a Compact Disk ROM device (CD-ROM), CD Recordable Drive (CD-R Drive), CD Rewritable Drive (CD-RW Drive) or a Digital Video Disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, Random Access Memory (RAM), Read Only Memory (ROM), Electrically Erasable Programmable Read Only Memory (EEPROM), flash memory or other memory technology, Solid State Drive (SSD) or other solid-state storage technology, Compact Disk Read Only Memory (CD ROM), Digital Video Disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as Local-Area Networks (LAN) and Wide-Area Networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an Application Specific Integrated Circuit (ASIC), a Digital Signal Processor (DSP), a Field Programmable Gate Array (FPGA), a Programmable Logic Controller (PLC), a Complex Programmable Logic Device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced; or 5G NG-RAN What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
receiving, by network equipment comprising a processor, a request to connect a user equipment for communication of data via a network;
determining, by the network equipment, first location information associated with a first location of the user equipment;
in response to determining the first location information, overriding, by the network equipment, a centralized access point name of a centralized gateway device with a first edge-located access point name to facilitate communication of data between the user equipment and first edge-located access point equipment; and
in response to determining second location information associated with a second location of the user equipment, overriding, by the network equipment, the first edge-located access point name with a second edge-located access point name to facilitate communication of additional data between the user equipment and second edge-located access point equipment.

2. The method of claim 1, wherein overriding the centralized access point name with the first edge-located access point name comprises overriding an existing packet data network gateway equipment with edge packet data network gateway equipment.

3. The method of claim 2, further comprising determining that the edge packet data network gateway equipment is available.

4. The method of claim 1, further comprising, selecting, by the network equipment, a user plane function for the user equipment based on an identifier of the first edge-located access point equipment.

5. The method of claim 4, further comprising determining, by the network equipment that the user plane function is available.

6. The method of claim 1, further comprising, selecting, by the network equipment, a user plane function for the user equipment based on a tracking area code associated with a network tracking area.

7. The method of claim 1, further comprising establishing, by the network equipment, that there is no lawful interception monitoring associated with the user equipment.

8. The method of claim 1, further comprising at least one of:
obtaining, by the network equipment, subscription information associated with the user equipment and determining, based on the subscription information, that the user equipment qualifies for the communication of the data via the first edge-located access point equipment, or
evaluating, by the network equipment, data service type information associated with the user equipment and determining, based on the data service type information, that the user equipment is to communicate the data via the first edge-located access point equipment.

9. The method of claim 1, further comprising communicating with a core charging system to facilitate tracking an amount of data associated with the communication of the data between the user equipment and the first edge-located access point equipment.

10. Network equipment, comprising:
a processor; and
a memory that stores executable instructions that, when executed by the processor, facilitate performance of operations, the operations comprising:
receiving a request for connection of a user equipment for data communication via a network;
obtaining first location information associated with a first location of the user equipment;
in response to determining the first location information, overriding a centralized access point name of centralized gateway equipment with a first edge-located access point name to facilitate the data communication between the user equipment and first edge-located access point equipment; and
in response to determining second location information associated with a second location of the user equipment, overriding the first edge-located access point name with a second edge-located access point name to facilitate communication of additional data between the user equipment and second edge-located access point equipment.

11. The network equipment of claim 10, wherein obtaining the location information comprises evaluating an identifier of a local node associated with the user equipment or evaluating a tracking area code representative of a tracking area associated with the connection of the user equipment.

12. The network equipment of claim 10, wherein the overriding the centralized access point name with the first edge-located access point name comprises overriding existing packet data network gateway equipment with edge packet data network gateway equipment.

13. The network equipment of claim 10, wherein the operations further comprise establishing that the first edge-located access point equipment is able to service the user equipment based on at least one of: a first availability of an edge 4G packet data network gateway device, a second availability of an edge 4G serving gateway, or a third availability of an edge 5G user plane function.

14. The network equipment of claim 10, wherein the operations further comprise establishing that the first edge-located access point equipment is able to service the user equipment based on determining, according to a criterion, that no interception monitoring associated with the user equipment is related to commission on accreditation for law enforcement agencies.

15. The network equipment of claim 10, wherein the operations further comprise establishing that the first edge-located access point equipment is able to service the user equipment based on obtaining subscription information associated with the user equipment, and determining, based on the subscription information, that the user equipment qualifies for the data communication between the user equipment and the first edge-located access point equipment.

16. The network equipment of claim 10, wherein the operations further comprise establishing that the first edge-located access point equipment is able to service the user equipment based on evaluating data service type information associated with the user equipment.

17. A machine-readable storage medium, comprising executable instructions that, when executed by a processor of network equipment, facilitate performance of operations, the operations comprising:
receiving a request for data communication by a user equipment via a network;
obtaining first location information associated with a first location of the user equipment;
overriding, based on the first location information, a centralized access point name of a centralized gateway device with a first edge-located access point name to facilitate the data communication between the user equipment and a first edge-located access point device associated with the first edge-located access point name; and
in response to obtaining second location information associated with a second location of the user equipment, overriding, based on the second location information, the first edge-located access point name with a second edge-located access point name to facilitate communication of additional data between the user equipment and a second edge-located access point device.

18. The machine-readable storage medium of claim 17, wherein the operations further comprise, determining that the first edge-located access point device is able to service the user equipment based on at least one of: determining a first availability of an edge 4G packet data network gateway device, determining a second availability of an edge 4G serving gateway, determining that interception monitoring associated with the user equipment is nonexistent or not related to CALEA, or determining a third availability of an edge 5G user plane function.

19. The machine-readable storage medium of claim 17, wherein the operations further comprise, determining that the first edge-located access point device is able to service the user equipment based on at least one of: obtaining subscription information associated with the user equipment and determining, based on the subscription information, that the user equipment qualifies for the data communication between the user equipment and the first edge-located access point device, or determining, based on a data service type to be communicated, that the data service type is suitable for the data communication between the user equipment and the first edge-located access point device.

20. The machine-readable storage medium of claim 17, wherein overriding the centralized access point name with the first edge-located access point name comprises overriding an existing packet data network gateway device with an edge packet data network gateway device.

* * * * *